United States Patent [19]

Shimp

[11] 3,959,695

[45] May 25, 1976

[54] CIRCUIT INTERRUPTER WITH GROUND FAULT TRIP CONTROL

[75] Inventor: Alan B. Shimp, Monroeville, Pa.

[73] Assignee: Westinghouse Electric Corporation, Pittsburgh, Pa.

[22] Filed: Apr. 29, 1975

[21] Appl. No.: 572,693

[52] U.S. Cl. .......................... 317/33 R; 317/36 TD; 317/33 SC
[51] Int. Cl.² .................................... H02H 3/08
[58] Field of Search .......... 317/33 R, 33 SC, 36 TD, 317/18 R, 27 R, 141 S, 38; 307/293

[56] References Cited
UNITED STATES PATENTS

| | | | |
|---|---|---|---|
| 3,713,005 | 1/1973 | Engel........................... | 317/36 TD X |
| 3,786,311 | 1/1974 | Hobson, Jr. et al. ........ | 317/36 TD X |
| 3,818,275 | 6/1974 | Shimp.......................... | 317/36 TD X |
| 3,846,675 | 11/1974 | Shimp.......................... | 317/36 TD X |
| 3,851,216 | 11/1974 | Clarke et al................. | 317/36 TD X |

*Primary Examiner*—R. N. Envall, Jr.
*Assistant Examiner*—Patrick R. Salce
*Attorney, Agent, or Firm*—M. J. Moran

[57] ABSTRACT

A circuit interrupter having an associated control system which senses overload current or ground fault current and causes an appropriate tripping of the circuit interrupter. Tripping energy for causing the circuit interrupter to open under a normal fault condition is derived from the fault current itself. In addition, tripping energy for causing the circuit interrupter to open due to a ground fault condition is derived from the ground fault current.

13 Claims, 3 Drawing Figures

CIRCUIT INTERRUPTER WITH GROUND FAULT TRIP CONTROL

BACKGROUND OF THE INVENTION

This invention generally relates to circuit breakers with tripping circuits and it specifically relates to circuit breakers with ground fault trip control circuits.

U.S. Pat. No. 3,818,275, issued June 18, 1974, to A. B. Shimp and assigned to the assignee of the present invention discloses a circuit interrupter system for sensing fault current in a line to be protected, for deriving intelligence about the status of the fault current and for causing the circuit interrupter to initiate a tripping action when the fault current reaches a predetermined level. After the tripping action has been initiated sufficient energy for continuing the tripping operation to its completion is derived from the fault current. Consequently the control system provides intelligence concerning the proper time to trip the circuit breaker prior to the actual tripping operation but does not provide any tripping energy as it is obviously not needed at this time. After the tripping operation has begun, the control system provides tripping energy and no intelligence, as obviously intelligence is no longer needed. However, it is sometimes desirous to sense the presence of ground fault current in a line to be protected and to cause a tripping operation based on the presence of the ground fault current. Since ground fault current may not be of sufficient magnitude to supply tripping energy during that part of the tripping operation when it is needed, it would be advantageous if a separate energy deriving circuit utilizing only ground fault current could be provided for substantially guaranteeing the completion of the ground fault tripping operation once it has begun.

SUMMARY OF THE INVENTION

In accordance with the invention a circuit breaker apparatus is taught which has two control and energizing circuits. The first control and energizing circuit is similar to that described in the previously mentioned U.S. Pat. No. 3,818,275. On the other hand, the second circuit which is integrally interconnected with the first circuit and which uses common portions thereof senses the presence of ground fault current in the line to be protected and provides sufficient electrical energy (derived from the ground fault current) to the trip coil of the circuit breaker to guarantee that the circuit breaker will continue the tripping action to completion once the tripping action has begun.

BRIEF DESCRIPTION OF THE DRAWINGS

For a better understanding of the invention reference may be had to the preferred embodiments exemplary of the invention shown in the accompanying drawings in which.

DESCRIPTION OF THE PREFERRED EMBODIMENTS

Figure 1:
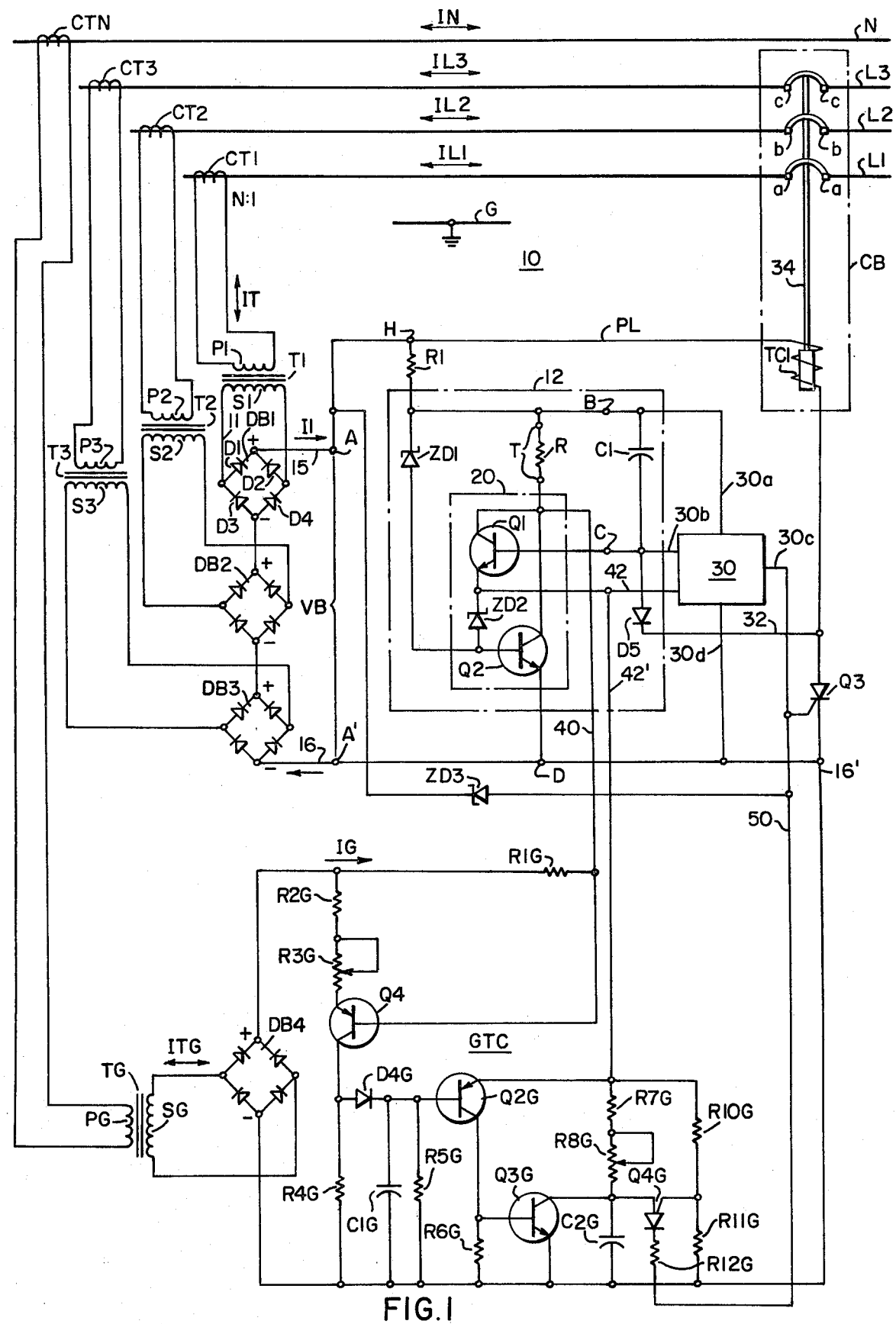
FIG. 1 is a schematic diagram view of a polyphase electrical system which is protected by a circuit breaker that includes a control circuit.

Referring now to the drawings and to FIG. 1 in particular, an electrical system 10 is shown. The electrical system 10 may be utilized to control a circuit breaker CB which in turn may protect a three phase, single phase, or polyphase alternating current electrical system. The three phases may comprise electrical lines or conductors L1, L2, L3 and a neutral line N. There may also be present a ground G. Each of the conductors L1, L2, L3 and N may have flowing therein respectively electrical currents IL1, IL2, IL3 and IN. These electrical currents are alternating electrical currents in the preferred embodiment of the invention. Each of the lines L1, L2, L3 and N may have interconnected therewith current transformers or other suitable current sensing means CT1, CT2, CT3 and CTN respectively. The outputs of each current transformers CT1, CT2 and CT3 may be connected in series circuit relationship respectively with the primary windings P1, P2 and P3 of transformers T1, T2 and T3 respectively. The series circuit combinations of the transformer windings CT1/P1, CT2/P2 and CT3/P3 may be connected in parallel circuit relationship across the output of the current transformer CTN. Also connected across the output of the current transformer CTN may be the primary winding PG of a transformer TG. Each of the transformers T1, T2 and T3 have a secondary winding S1, S2 and S3 respectively. Connected across the secondary winding S1 are the input terminals of a full wave bridge rectifier DB1 which includes four diodes D1–D4. Likewise connected across the secondary winding S2 are the input terminals of a similar full wave bridge rectifier DB2. Connected across the secondary winding S3 are the input terminals of a full wave rectifier DB3. The output terminals of the full wave bridge rectifiers DB1, DB2 and DB3 may be interconnected in series circuit relationship to form a total bridge output at the terminals A and A'. Line or conductor 15 may be connected between the plus (+) output terminal of the bridge DB1 and the terminal A. Line or conductor 16 is connected between the minus (−) output terminal of the bridge DB3 and the terminal A'. Connected to the terminal A is one end of a resistive element R1 at the terminal H. Also connected to terminal A is the regulating end of a Zener diode element ZD3 and one end of a power supply line PL for the trip coil TC1. Connected to the other end of the resistive element R1 is the regulating end of a Zener diode element ZD1, one end of a resistive element R, one end of a capacitor element C1 and one end of a power supply terminal 30a for a timing circuit 30 (shown only as a functional block in FIG. 1). Connected to the anode of the Zener diode element ZD1 may be the anode of another Zener diode element ZD2 and the base of an NPN transistor Q2. Connected to the regulating terminal of the Zener diode element ZD2 may be the emitter of an NPN transistor or similar means Q1 and two electrical conductors 42 and 42'. The collector of the transistor Q1 is connected to the collector of the transistor Q2 and to the other side of the resistive element R. Also connected to the latter mentioned side of the resistive element R is a lead or conductor 40. The base of the transistor Q1 is connected to the other side of the previously mentioned capacitive element C1 and to an input terminal 30b of the timing device 30. Also connected to the base of the transistor Q1 is the anode of a diode element D5, the cathode of which is connected to the other side of the trip coil TC1 and to the anode of a silicon controlled rectifier or similar gated means Q3. Connected to the gate of the silicon controlled rectifier or similar gated means Q3 is an output terminal 30c of the timing means 30 and the anode of the previously described Zener diode means ZD3. Also connected to the gate of the silicon controlled rectifier Q3 is a lead or conducting line 50.

Connected to the terminal A' is the emitter of the diode Q2, the other power supply terminal 30d for the timing means 30, the cathode of the silicon controlled rectifier means Q3 and portions of a ground trip circuit GTC, which will be described hereinafter.

The trip coil TC1 may control a mechanical linkage 34 which interconnects the movable core of the trip coil TC1 with separable main contacts a—a, b—b and c—c, for lines L1, L2 and L3 respectively. Consequently when the trip coil TC1 is properly energized the linkage 34 causes the separable main contacts to open thus protecting the previously mentioned electrical conductors or lines L1, L2 and L3.

There is provided a ground tripping control circuit GTC. The input to the ground tripping control circuit GTC is the secondary winding SG of the previously described transformer TG. Across this winding is connected the input terminals of a diode bridge DB4. The positive output terminal (+) of the diode bridge is connected to one end of a resistive element R2G and to one end of a resistive element R1G. The other end of the resistive element R2G is connected to one end of a resistive element or potentiometer R3G, the other end of which may be connected to the emitter of a PNP transistor Q4. The base of transistor Q4 is connected to the other end of the resistive element R1G and to the previously described conductor 40. The collector of the transistor Q4 is connected to one end of a resistive element R4G and to the anode of a diode element D4G. The cathode of the diode element D4G is connected to one end of a capacitive element C1G, one end of a resistive element R5G, and the base of a PNP transistor Q2G. The emitter of the transistor Q2G is connected to one end of a resistive element R7G, one end of a resistive element R10G and to the previously described conductor 42'. The collector of the transistor Q2G is connected to one end of a resistive element R6G and to the base of an NPN transistor Q3G. The collector of the transistor Q3G is connected to one end of a potentiometer or resistive means R8G, one end of a capacitor means C2G and to the anode of a programmable unijunction transistor Q4G. The other end of the potentiometer R8G is connected to the other end of the previously mentioned resistive element R7G. The gate of the programmable unijunction transistor Q4G is connected to the other end of the previously mentioned resistive element R10G and to one end of a resistive element R11G. The cathode of the programmable unijunction transistor Q4G is connected to one end of a resistive means R12G, the other end of which is connected to the previously described line 50. The other ends of the resistive element R4G, capacitive element C1G, resistive element R5G, resistive element R6G, capacitive element C2G and resistive element R11G as well as the emitter of transistor Q3G are connected to a conductor 16' which in turn is connected to the line 16. The previously described Zener diodes ZD1 and ZD2, transistors Q1 and Q2, resistor R, capacitor C1, and diode D5 comprise a solid state or static type control system 12. The transistors Q1, Q2 and the Zener diode ZD2 alone comprise a combination regulating and switch means 20.

The timing circuit 30 may be actuated by the static control system 12 in response to a fault on lines L1, L2, and/or L3 to cause actuation of the silicon control rectifier Q3 at the gate thereof to initiate a tripping action in the circuit breaker CB. The ground trip action is in response to the presence of a ground fault current between any of the lines L1, L2, L3 and/or N to ground G. Similarly, the trip coil TC1 is energized for a circuit interrupting operation of the circuit breaker CB by energy provided on the line PL from line 15 in the case of a normal fault or from the resistive element R1 as will be described hereinafter in the case of a ground fault.

OPERATION OF THE NORMAL FAULT SENSING CIRCUIT 12 PRIOR TO TRIPPING

The current transformers CT1 through CT3 provide current to the primary windings P1 through P3 respectively of the transformers T1 through T3 respectively. The current in each case is proportional to the currents IL1 through IL3 respectively. The arrangement of the diode bridges DB1 through DB3 which are supplied by the secondary windings S1 through S3 respectively is such that an auctioneering action is possible. An auctioneering action is one in which the highest value of currents IL1 through IL3 will become related to voltage VB at the terminals A, A'. The current flowing through the terminals A, A' is designated I1. This is a unidirectional pulsating current. The current I1 is related to the value of the highest current IL1 through IL3. The current I1 is supplied to the sensing and empowering circuit or network 12 where an informational signal is impressed across the resistor R which signal is proportional to the level of current I1 which of course is related to the value of the highest current IL1 through IL3. This informational signal is used to provide information at terminals B and C of FIG. 1. Presuming that a fault current is not flowing in any of the lines L1 through L3, the silicon control rectifier Q3 is substantially nonconducting and consequently substantially no current flows through the trip coil TC1. Because of this substantially all of the electrical current I1 is used for providing signal or informational energy to the timing circuit 30 by way of the combination sensing and empowering circuit 12, Virtually none of the above-mentioned current flows through the trip coil TC1.

The regulating properties of the previously described combination regulating and switching means 20 insure that the voltage between the terminals B and D of FIG. 1 is at a predetermined DC value, the level of which increases with an increase in the peak value of current I1. The regulating characteristics associated with the regulating and switching means 20 will be described hereinafter more completely. A generally fixed or predetermined level reference voltage exists across terminals C and D of the network 12 against which is measured or compared the voltage across terminals B and C which may vary in proportion to the level of current I1. Consequently when one of the currents or all of the currents IL1 through IL3 exceeds a predetermined value a timing operation is begun within circuit 30 which thereafter leads to the energization of the silicon control rectifier Q3 which thereby completes the circuit between the terminal H and a terminal D, whereby current flows through the trip coil TC1 to empower it at a sufficient magnitude and for a sufficient duration to complete the opening operation of the circuit breaker CB. Concurrently, a signal is provided by way of a line 32 and the diode D5 to the combination regulating and switch means 20 causing means 20 to switch off or to prevent conduction of electrical current through the resistive means or resistor R. This means that before tripping, virtually all of the energy of the lines L1 through L3 as auctioneered by the diode bridges DB1 through DB3 is used for sensing purposes. Conversely, after tripping has begun, substantially or virtually all of the previously mentioned current or energy at any instant time is used to empower the trip coil TC1 until completion of the tripping operation. Virtually or substantially none of the current I1 is used for sensing or intelligence purposes at this time. The sensing portion of the circuit of network 12 is thus inactive or inhibited at this time.

The current I1 flows substantially entirely through the resistive element or resistor R because the silicon controlled rectifier or switching means Q3 is substantially nonconducting or opened at this time. A voltage is therefore developed across the resistive element R between the terminals T—T at either end thereof. This voltage is substantially proportional to the magnitude of current I1 flowing through resistive element R. The peak value of this voltage at any instant of time is substantially proportional to the largest current IL1 through IL3 flowing in the lines L1 through L3. Most of the current I1 at this time flows through the resistive element R.

A portion of the current I1 flows into the collector-to-emitter circuit of the transistor Q1 and then through the Zener diode ZD2 into the base to emitter circuit of the transistor Q2 and from there to the common point D. It will be noted that regardless of the amount of current I1 flowing, the voltage drop of the base-to-emitter circuit of transistor Q2 is substantially constant. In a similar manner the voltage drop across the Zener diode ZD2 is also generally constant and of a substantially predetermined value. Finally and in a similar manner the voltage drop across the base-to-emitter junction of the transistor Q1 is also substantially constant. Consequently the voltage drop between the terminal C or the base of transistor Q1 and the terminal D or the emitter of transistor Q2 is substantially constant and is the reference voltage for the timing circuit 30.

Since the capacitive element C1 is connected in series combination with the resistive element R and the emitter-to-base circuit of the transistor Q1 the value of the voltage across the capacitor C1 will be generally equal to the peak value of the voltage across the resistor R. Consequently as the peak or maximum value of the pulsating voltage across the resistor R increases or decreases the level of the voltage across the capacitor C1 which is generally constant increases or decreases substantially proportionally. This voltage is the input signal to the timing circuit 30 and is compared with or against the reference signal previously described to determine when a timing operation should begin. The elements (not shown) of the timing circuit 30 may be adjusted so that the voltage across the capacitor C1 will cause operation or initiation of the timing circuit 30 when a predetermined value of voltage is impressed across the capacitive element C1. This will produce a signal at the output terminal 30c of the timing unit 30 for subsequently tripping the circuit breaker CB by energizing the gate of the thyristor or silicon controlled rectifier Q3.

OPERATION OF THE GROUND FAULT TRIP CONTROL CIRCUIT GTC PRIOR TO THE TRIPPING OPERATION

The arrangement of the transformers CT1, CT2, CT3, CTN, T1, T2, T3 and TG is known. Associated with the latter arrangement is the principle that the current ITG flowing in the secondary winding SG of the transformer TG is proportional to the value of ground fault current. It is to be understood that if a ground fault current flows, any of the lines L1, L2, L3 or N or a combination of them must accommodate that ground fault current. Consequently the current transformers CT1 through CT3 will provide an indication of this at the terminals A and A' of FIG. 1. However, because of the insidious nature of ground faults, it is likely that the ground fault current will be of a low magnitude which is insufficient to cause an initiation of the tripping of the circuit breaker CB through unit 12 and insufficient to empower it from the terminal H through the line PL as was previously described. The current ITG flows through the input terminals of the diode bridge DB4, where a corresponding current IG is provided for the ground trip current GTC. A voltage which is proportional to the ground current appears across the resistor R4G of the voltage divider network containing that resistor and the resistors R2G and R3G as well as the transistor Q4. The voltage is given by the equation which is described below:

$$V(R4G) = IG \times R1G \times (R4G/(R3G + R2G))$$

This latter voltage is supplied by way of the diode D4G to be impressed across the capacitor C1G, where the peak value thereof is stored. Resistor R5G is a base drive resistor for the transistor Q2G. Likewise, resistor R6G is the collector resistor for the transistor Q2G. The previously described reference voltage between the terminals C and D is sent back to the ground trip circuit GTC across the lines 42' and 16'. If this voltage is higher than the voltage across the capacitive element C1G, then the transistor Q2G is in an on state and consequently transistor Q3G is also in an on state. Since transistor Q3G is in an on state the capacitive element C2G is shorted thereby. If, however, the predetermined interrelationship of the voltage across the capacitor C1G and the previously described reference voltage is of such a value as to indicate that a predetermined value of ground fault current is flowing in the circuit to be protected, then the transistor Q2G will be turned off by the forward biasing of the base to emitter circuit thereof. This consequently turns off the transistor Q3G thus removing the short from across the capacitor C2G. This allows the capacitor C2G to be charged through the resistive elements R7G and R8G until a voltage is reached which is impressed on the gate of the programmed unijunction transistor Q4G which latter voltage is larger than the voltage on the anode thereof as determined by the voltage divider network comprising the resistors R10G and R11G. Once the programmed unijunction transistor Q4G is turned on, an energizing pulse of current is provided by way of the resistor R12G and a line 50 to the gate of the silicon controlled rectifier or similar gating means Q3 to initiate the tripping operation in the circuit breaker CB.

OPERATION OF THE NORMAL FAULT TRIP CIRCUIT 12 AFTER A TRIPPING OPERATION HAS BEEN INITIATED

The voltage across the silicon controlled rectifier means Q3, which is the voltage between the line 32 and the terminal D, drops to approximately zero volts when the silicon controlled rectifier Q3 has been turned on. This causes the regulating portion 20 of the control system 12 to be effectively disconnected from the resistor R. The previously described current I1 flowing across the terminals A and A' is directed from terminal H through the line P1 and the trip coil TC1 to energize that trip coil sufficiently to cause a completion of the tripping operation of the circuit breaker CB. The voltage VB will have a value equal to the product of the current I1 times the resistance (not shown) of the trip coil TC1 because the regulating portion of the circuit comprising the transistors Q1 and Q2 and Zener diodes ZD2 has been effectively disconnected as described previously. If the voltage VB reaches the breakdown voltage of Zener diode ZD1 due to high values of current I1, the voltage VB will be clamped at a maximum value which is related to the regulating voltage of the Zener diode ZD1. High values of current I1 will correspond to high values of the line currents IL1 through IL3 in the lines L1 through L3 respectively which are being protected. If there are high values of currents in the lines L1, L2, L3 and/or N, the current transformers CT1-CTN will attempt to produce a proportional secondary current and hence a high value of the current I1 regardless of the presence of secondary burden imposed on the current transformers. The conduction of the Zener diode ZD1 has a tendency to provide base current to the transistor Q2 to turn it on to thus provide a bypass for the excessive current I1 through the resistor R and the transistor Q2. This is the opposite effect than the effect provided by reducing the voltage across the conducting silicon controlled rectifier Q3. However, the regulating characteristic does not interfere with the flow of substantial current through the line PL to the trip coil TC1 for tripping. Of course the current and related voltages will continue until the circuit breaker completely opens, thus interrupting the currents IL1 through IL3, thus removing the various currents and voltages from the circuit 12 and the circuit GTC until the circuit breaker is once again closed.

OPERATION OF THE GROUND FAULT TRIP CONTROL CIRCUIT GTC AFTER A TRIPPING OPERATION HAS BEGUN

Since the value of current IG for a given ground fault current is based on the required current to operate the trip coil TC1, the ground trip circuit GTC components are chosen to provide the desired range of adjustment of trip level and trip time. The potentiometer R3G controls the range of ground fault current at which the circuit GTC will cause a ground fault tripping operation. The potentiometer R8G controls the range of time delay because it affects the charging time of the capacitor C2G. The resistor R1G which may be included as part of a rating plug, that is, may be included with resistor R as a plug-in unit for the circuit 10, determines the ground trip rating of the circuit breaker CB, Before the regulating device 20 was turned off by the voltage across the conducting silicon controlled rectifier Q3 the current IG which flowed through the resistive element R1G and line 40 was conducted through the relatively low impedance path of the element 20 to the returned line 16' for the ground trip circuit GTC. However, after the regulating device 20 is turned off at the initiation of the tripping operation, the current IG flows through the resistive element R, the resistive element R1 and the line PL to the trip coil TC1 and back to the return line 16'. As was mentioned previously, the current IG is substantially sufficient in itself even at relatively low values of ground fault current to energize the trip coil TC1 to cause the circuit breaker CB to complete a tripping operation. As a bonus any component of current I1, which may result because of the flow of ground fault current in the lines L1, L2 or L3, also flows through the line PL to add to the tripping current IG. As a result, all of the available current from the various current transformers is supplied to the trip coil TC1 for tripping. In order to trip rapidly and directly on ground fault currents of as low a value as 10% of rated braking current, the use of all available current for tripping is required and desirable.

Figure 2:
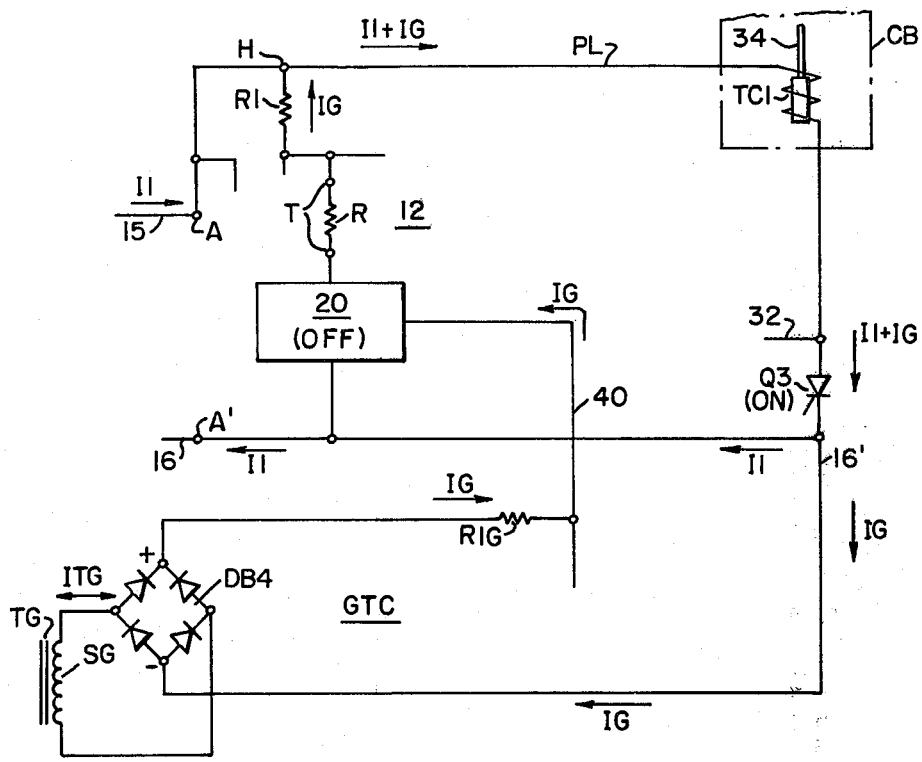
FIG. 2 is a schematic diagram of the portion of the electrical circuit shown in FIG. 1 which is related to supplying energy to the trip coil of FIG. 1 during a ground fault interruption.

Referring now to FIG. 2, the energizing path of the trip coil TC1 for a ground fault trip is shown without the remaining circuit elements for clarity. In particular, it can be seen that the current ITG on the secondary winding SG of the transformer TG provides the unidirectional current IG at the output of the bridge DB4. This current flows through the resistive element R1G and then through line 40 to one of the terminal T in circuit 12. The current then flows through the resistive element R and the resistive element R1 to terminal H. Here it is added to the residual current I1 provided at the terminal A. Together they flow into the line PL and the trip coil TC1 to energize the trip coil TC1 sufficiently to cause completion of the tripping operation. The current is returned past the terminal for line 32 through the conducting SCR, Q3 which is in the on state at this time, toward the line 16'. At this point, the current I1 flows towards the terminal A' as part of its return path. On the other hand, the current IG continues to flow in the line 16' towards the diode bridge DB4 as its return path. It will be noted at this time that the regulating means 20 is substantially off or at a sufficiently high resistance value compared with the current path for the trip coil TC1 to ensure sufficient energization of the trip coil TC1.

Figure 3:
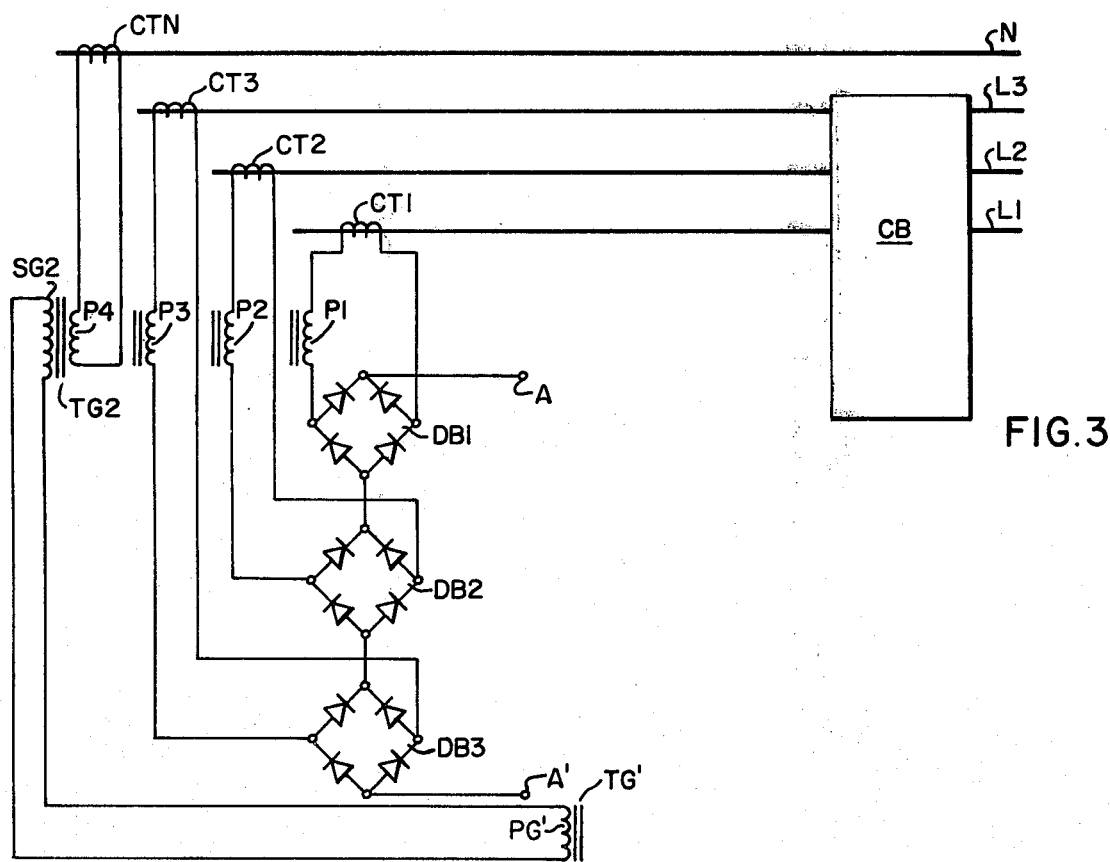
FIG. 3 shows an alternate arrangement of transformers for supplying intelligence and energizing power to the circuitry of FIG. 1.

Referring now to FIG. 3, another arrangement for the sensing and empowering transformers and the diode bridges which are interconnected with terminals A and A' is shown. In this case each of the four current transformers CT1, CT2, CT3 and CTN, which are electrically and magnetically interconnected with the lines L1, L2, L3 and N respectively, have series connected primary windings P1, P2, P3 and P4 interconnected therewith. Furthermore, the diode bridge DB1 is interconnected at its input terminals to the series arrangement of the current transformer CT1 and the primary winding P1. Likewise, the diode bridge DB2 is interconnected with the current transformer CT2 and the primary winding P2. Finally, the diode bridge DB3 is interconnected with the current transformer CT3 and the winding P3. This provides the auctioneering current I1 which may flow across the terminals A and A'. The current Transformer CTN has no diode bridge connected therewith. The previously described primary windings P1, P2, P3 and P4 comprise one winding each of a four primary winding transformer TG2, the secondary of which is designated SG2. The secondary winding SG2 is connected in series circuit relationship with a primary winding PG' of a transformer TG' which is similar to the transformer TG shown in FIG. 1. The output of the transformer TG' supplies the previously described solid state ground fault trip circuit GTC with the current ITG as shown in FIG. 1. In this latter arrangement, each primary winding, P1 through P4 of the transformer TG, carries the output of one of the line current transformers continuously. This usually results in the transformer TG being physically larger than was previously required. However, on the other hand, three transformers T1, T2 and T3, as shown in FIG. 1, are eliminated.

It is to be understood with respect to the embodiments of this invention that the operation of the circuit GTC is integral with the operation of the circuit 12 shown in FIG. 1 and many functions utilized common circuit elements. As an example, the provision of tripping current to the coil TC1 during either a normal tripping operation where no ground fault current is present or during a ground fault tripping operation is accomplished through the line PL and the silicon controlled rectifier Q3. In addition, the reference voltage across the terminals C and D is interrelated with the initiation of a tripping operation by the ground fault circuit GTC. Also, the status of the regulating circuit 20 affects the operation of the ground fault tripping coil circuit GTC. However, it is also to be understood that not all of the operations of the circuit 10 need be utilized exactly as previously described, that is to say they are not limiting. In a previous use of the circuit 10, energy was supplied to the trip coil TC1 directly through the resistive element R1. That is not the case in the present invention. It is also to be understood that the particular arrangement of the current transformers and the diode bridges and ground fault sensing transformers such as shown in and described with respect to FIGS. 1 and 3 are not limiting. It is also to be understood that the particular circuit arrangement of the circuit to be protected is also not limiting, nor is the circuit breaker arrangement. Polyphase circuitry or single phase circuitry may be used and protected. The wiring may be delta, star or any combination thereof. It is also to be understood that the operation of the circuit 12 is described more fully in the previously described U.S. Pat. No. 3,818,275. It is also to be understood that a neutral line N described with respect to the Figures need not be present in all types of polyphase circuits. In such an event the current transformer CTN is not used or needed.

The apparatus embodying the teachings of this invention have several advantages. One advantage lies in the fact that the various transformer arrangements shown allow for a wide range of choice in the number and size of the transformers used. As an example, the transformer arrangement of FIG. 1 utilizes smaller transformers but more of them than the arrangement shown in FIG. 3. Specifically, the transformer TG' of FIG. 3 is generally larger than the transformer TG of FIG. 1, however the total number of transformers required for the embodiment of FIG. 3 is less than the total number required for the embodiment of FIG. 1. Another advantage lies in the fact that in order to rapidly trip directly on a ground fault current which may be as low as 10% of rated breaking current, the use of all available current for energizing the trip coil is necessary. The requirement of a minumum trip current during as little as one cycle of fault current provides enough time to permit the use of an energy storage capacitor to accumulate the necessary energy for tripping. Consequently, the energy for tripping is derived from the line or network which is being protected by the circuit breaker system. This eliminates the need for an energy storage capacitor and it also eliminates the need to accommodate the size of a storage capacitor which would have to large to provide the same amount of tripping energy as is provided by apparatus of the present invention. Another advantage lies in the fact that the present arrangement allows for the tripping of a circuit breaker which protects a system when a ground fault is flowing in the system of a relatively low value when compared with the rating of the circuit breaker system. This is because a special ground tripping circuit is provided which is utilized to energize the trip coil of the circuit breaker system.

What I claim as my invention is:

1. Apparatus for interrupting electrical ground fault current in a conductor of an electrical system, comprising:
    a. circuit interrupting means interconnected with said conductor, said circuit interrupting means having a current actuated means for causing the interrupting operation of said circuit interrupting means;
    b. first sensing means disposed in cooperating relationship with said electrical system for sensing the value of electrical current flowing in said conductor and for providing an output current related to said latter value of current, said first sensing means being interconnected with said current actuated means for supplying actuating current thereto;
    c. second sensing means disposed in cooperating relationship with said electrical system for sensing the value of ground fault electrical current flowing in said conductor and for providing an output current related to said latter value of current, said second sensing means being interconnected with said current actuated means for supplying actuating current thereto;
    d. switch means interconnected in circuit relationship with said current actuated means for controlling the flow of electrical current therethrough; and
    e. control means interconnected with said first sensing means and said second sensing means and said switch means, said control means actuating said switch means to thus cause a portion of said first sensing means output current to flow through said current actuated means to thus cause said interrupting operation when said value of electrical current flowing in said conductor attains a first predetermined value, said control means actuating said switch means to cause a portion of said second sensing means current to flow through said current actuated means to thus cause said interrupting operation when said value of ground fault current flowing in said conductor attains a second predetermined value, said control means providing a return path for said portion of our first sensing means output current and said portion of said second sensing means output current which path is an alternate to said path through said current actuated means only whenever neither said current flowing in said conductor nor said ground fault current flowing in said conductor has attained said first or said second predetermined values respectively.

2. The combination as claimed in claim 1 wherein said circuit interrupting means comprises a circuit breaker having separable main contacts which open for causing said interrupting operation, and wherein said current actuated means comprises the trip coil for said circuit breaker.

3. The combination as claimed in claim 1 wherein said first sensing means comprises current transformer means disposed in electromagnetic relationship with said conductor.

4. The combination as claimed in claim 1 wherein said second sensing means comprises current transformer means disposed in electromagnetic relationship with said conductor.

5. The combination as claimed in claim 1 wherein said electrical system comprises a three phase alternating current system, and wherein said conductor comprises the conductor of one of said three phases.

6. The combination as claimed in claim 5 wherein said three phase system comprises a neutral conductor.

7. The combination as claimed in claim 6 wherein said second sensing means comprises current transformer means disposed in electromagnetic relationship with said conductor.

8. The combination as claimed in claim 6 wherein said second sensing means comprises a current transformer means disposed in electromagnetic relationship with said neutral conductor.

9. The combination as claimed in claim 1 wherein said switch means comprises a gated static device disposed in series circuit relationship with said current actuated means.

10. The combination as claimed in claim 9 wherein said gated device comprises a silicon controlled rectifier the anode and cathode of which are part of said series circuit relationship, wherein the gate of said silicon controlled rectifier is interconnected with said control means for providing the actuating function for said silicon controlled rectifier.

11. The combination as claimed in claim 1 wherein said return path comprises a portion of a transistor.

12. The combination as claimed in claim 1 wherein said circuit interrupter has a full load current rating, wherein said second predetermined value of said current is in a range of 5% to 20% of said full load current rating.

13. The combination as claimed in claim 12 wherein said second predetermined value of said current is generally 10% of said full load current rating.

* * * * *